United States Patent [19]

Thompson

[11] Patent Number: 4,528,607
[45] Date of Patent: Jul. 9, 1985

[54] MAGNETIC RECORD/PLAYBACK HEAD POSITIONING APPARATUS

[75] Inventor: Herbert E. Thompson, Los Gatos, Calif.

[73] Assignee: Drivetec, Inc., Milpitas, Calif.

[21] Appl. No.: 428,936

[22] Filed: Sep. 30, 1982

[51] Int. Cl.³ .................. G11B 21/18; G11B 21/24; G11B 5/54; F16H 1/18
[52] U.S. Cl. .................... 360/106; 360/104; 360/105; 74/424.8 R; 74/424.8 A
[58] Field of Search .................. 360/104, 105, 106; 74/409, 424.8 R, 424.8 A, 440, 441

[56] References Cited

U.S. PATENT DOCUMENTS

| | | | |
|---|---|---|---|
| 1,707,442 | 4/1929 | Maag | 74/441 |
| 2,610,519 | 9/1952 | Rokos | 74/441 |
| 2,903,902 | 9/1959 | Berggren | 74/441 |
| 3,703,835 | 11/1972 | O'Connor et al. | 74/441 |
| 3,757,591 | 9/1973 | Taylor | 74/424.8 A |
| 3,810,310 | 5/1974 | Morgan | 74/441 |
| 3,934,483 | 6/1976 | Luthi | 74/441 |
| 4,114,470 | 9/1978 | Sharpe | 74/441 |
| 4,209,813 | 6/1980 | Bryer | 360/105 |
| 4,309,732 | 1/1982 | Kronfeld et al. | 360/104 |
| 4,323,938 | 4/1982 | Thompson | 360/104 |
| 4,327,388 | 4/1982 | Wanek | 360/104 |
| 4,330,806 | 5/1982 | Iwabuchi et al. | 360/106 |
| 4,393,425 | 7/1983 | Wright | 360/105 |
| 4,418,371 | 11/1983 | Menden | 360/106 |

Primary Examiner—Robert S. Tupper
Attorney, Agent, or Firm—Claude A. S. Hamrick

[57] ABSTRACT

An apparatus for positioning magnetic record/playback heads in a floppy disk data storage and retrieval devices and including a carriage 12 upon which heads 14 and 16 are mounted, and a linear guidance mechanism comprising a fixed guide rod 18, a spring-loaded guide rod 20, and three carriage mounted bearing assemblies 25. The spring-loaded guide rod 20 is biased toward the fixed guide rod 18 and forces two of the bearing assemblies 25 against the fixed guide rod 18 by action through the third bearing assembly. Each bearing assembly 25 comprises two spherical balls 28 and 30 which are mounted in spherical seats 32 and spin in reaction to translation of the carriage 12. Radial positioning of carriage 12 and the attached heads is accomplished by a lead screw 22 driven by a stepper motor 24 which is coupled to the carriage through a zero backlash nut follower 75. Nut follower 75 is mounted in a spherical seat 122 in the carriage to allow rotation about axes perpendicular to the lead screw axis, and is restrained from rotating about the lead screw axis. Two springs 78 and 80 force the nut follower against the spherical seat and apply a torque to the nut follower about an axis perpendicular to the lead screw axis for eliminating clearance between the screw threads of the lead screw and the nut follower. One of the two record/playback heads is attached directly to the carriage, while the other head is attached to a moveable arm portion thereof which is pivotally attached to the carriage using a spring member 52. An adjustment screw acting on the spring member 52 is provided to allow adjustment of the contact force between the heads and the surface of the floppy disk.

21 Claims, 27 Drawing Figures

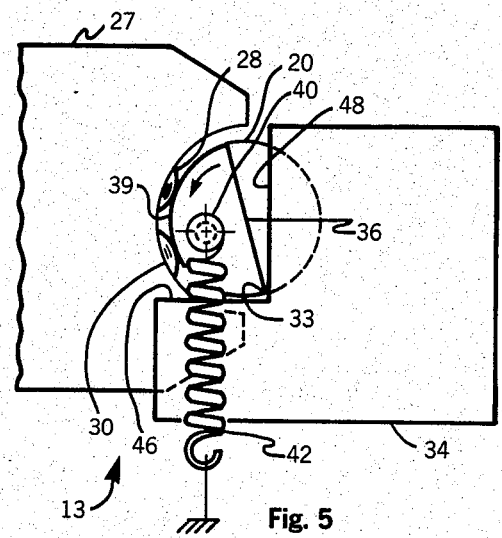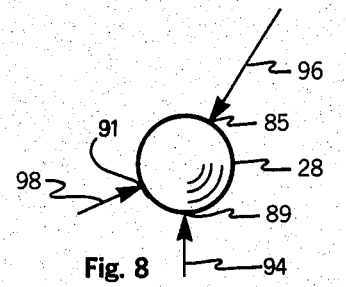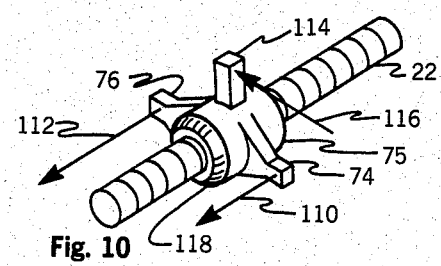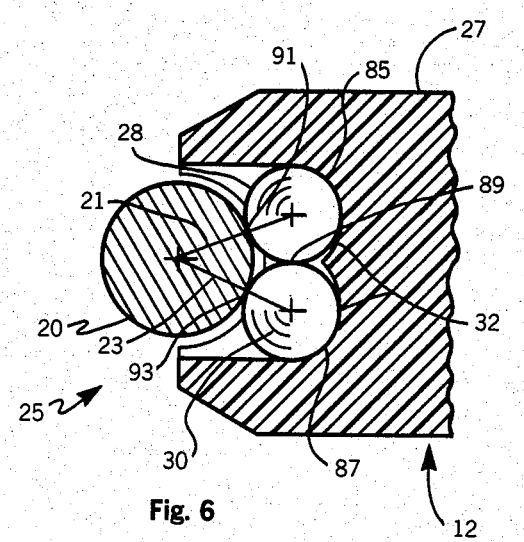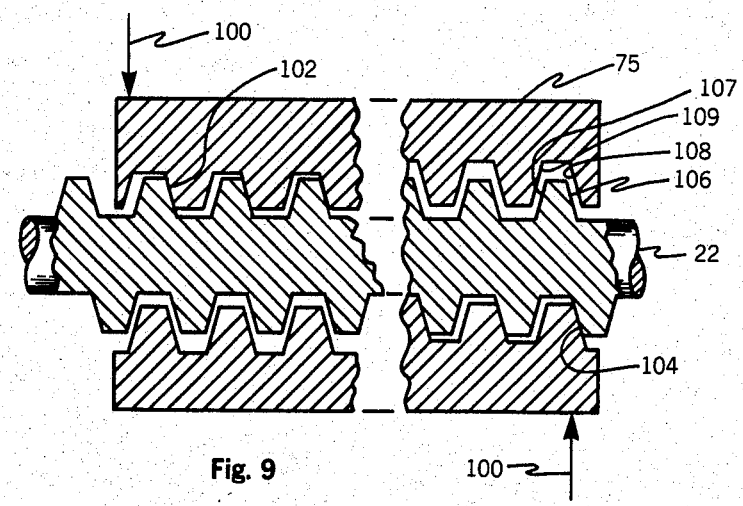

MAGNETIC RECORD/PLAYBACK HEAD POSITIONING APPARATUS

BACKGROUND OF THE INVENTION

1. Field of the Invention

The present invention relates generally to high precision linear positioning apparatus and more particularly to such apparatus as utilized for the purpose of positioning magnetic record/playback heads used to transfer data to and from flexible magnetic disks.

2. Description of the Prior Art

Disk drive systems that record data on and read data from flexible magnetic disks, or floppy disks as they are commonly known, are composed of several elements. The floppy disk itself is a thin mylar or polyester disk that is coated with a magnetic material and is enclosed in a protective envelope having access holes for spinning the disk and for accessing the magnetic surface. Disk spinning is accomplished by a motor driven spindle, while access to the magnetically encoded data is provided by magnetic record/playback head attached to a carriage that is positioned radially along a guide track by a drive mechanism. Digital data is recorded on the floppy disk in concentric recording tracks by positioning the record/playback head in contact with the spinning magnetic surface at the appropriate radial location and by electromagnetically exciting the record windings of the head thereby aligning the magnetic particles in the underlying surface coating in patterns corresponding to the digital data. Playback of the recorded data is accomplished by sensing the electromagnetic response of the playback windings of the head.

A trend toward higher data storage density has necessitated increasingly tighter tolerances on head positioning accuracy to allow closer intertrack spacing and, hence, more data storage per floppy disk. Precise head positioning throughout the service life of a disk drive, as well as accurate head positioning, referenced to a standard to allow floppy disk interchangeability among all disk drives, is desired.

Many disk drives utilize two magnetic record/playback heads and magnetic coatings on both surfaces of the floppy disk to increase data storage density. To insure the accurate transfer of data to and from the floppy disk, the contact force between the heads and the magnetic surface must be adjusted to and maintained at an optimum level. If the contact force is too high, excessive abrasion of the disk surface and consequently reduced service life will result, whereas a contact force that is too low may allow head bounce, and loss of data due to variations in disk thickness. Provisions must also be made to separate the upper and lower record/playback heads to allow for floppy disk loading and unloading.

What is needed therefore, is a precision record/playback head positioning apparatus that will accurately and consistently position the head, or heads, throughout the service life of the disk drive. What is additionally needed is a mechanism which allows an optimum contact force to exist between the record/playback heads and the magnetic surface of the floppy disk.

Another aspect of the present invention relates to devices utilizing screw threads for positioning or clamping purposes in which clearances between mating screw threads is a concern. A threaded positioning device typically employs an externally threaded shaft, or lead screw, and an internally threaded follower, or nut, which is translated along the axis of the shaft in response to shaft rotation. A clearance between mating screw threads is necessary to allow operation of the device without binding. However, this clearance also tends to decrease the positioning accuracy of the device.

Threaded fasteners used for clamping also suffer from thread clearance problems. In a situation where a threaded bolt is loaded in tension by a nut, a clamping force is generated through compressive loading of those screw thread flanks of the bolt that face toward the bolt head and are in contact with screw thread flanks of the nut that face away from the bolt head. Only one set of the two sets of facing flanks is normally in contact due to the clearances between the screw threads. Locking of the nut in place is accomplished by a friction force component of the contact force existing between contacting flanks, but due to the pitch of the screw, this contact force also has a loosening force component which tends to loosen the nut. Threaded fasteners used in vibratory situations therefore require additional means to insure locking.

Consequently, what is needed is a method for providing clearance between the screw threads of two mating devices so as to allow rotation of one device with respect to the other while at the same time maintaining accurate axial positioning. What is also needed is a method for locking mating screw threads by utilizing both sets of facing screw thread flanks to provide a clamping force free from any loosening force components.

Guidance and drive mechanisms are known in the prior art. For example, U.S. Pat. No. 3,946,439 and the "IBM Technical Disclosure Bulletin", Volume 18, Number 7, December 1975, pp. 2244–2245, both disclose record/playback head positioning apparatus that use parallel rods for lateral guidance, and tension band drives for radial positioning. A carriage, upon which a head is mounted, is guided laterally by one fixed rod while another fixed rod prevents rotation of the carriage. Such guidance mechanisms require clearances between the carriage and the rods to allow radial movement of the carriage without binding. However, these clearances reduce the attainable positioning accuracy of the apparatus. Furthermore, increases in clearances due to wear will even further reduce the positioning accuracy.

The tension band drive mechanism consists of a continuous loop, or band, that is attached to carriage and loops around a motor driven pulley and a tensioning pulley. The carriage is pulled by the tension band, in one direction or the other, in response to motor rotation. Inaccuracies due to hysteresis in the drive mechanism when reversing directions limits the precision of this approach.

An alternate guidance mechanism including a grooved track and follower is shown in U.S. Pat. No. 3,947,886. As disclosed, a carriage is spring loaded against a U-shaped track to provide lateral positioning. The positioning accuracy of this approach is susceptible to any accumulation of dirt in the track area and also to wear of the track or the track following pins.

Other prior art head positioning apparatus utilize motor driven lead screws to move and position carriage mounted record/playback heads. See, for example, U.S.

Pat. Nos. 3,678,481 and 4,030,137. The carriage in each of the above mentioned patents translates along the axis of the lead screw in response to rotation of the lead screw. A fixed rod, parallel to the axis of the lead screw restricts carriage rotation. Running clearance and wear between the lead screw and its follower are again limiting factors in the positioning accuracy of this type of head positioning apparatus.

A linear bearing of a type having reduced wear related problems and loss of accuracy is disclosed in U.S. Pat. No. 2,952,145. While this linear bearing reduces loss of positioning accuracy due to wear of the guidance mechanism, no provisions are disclosed for reducing the running clearances to those required of a high precision positioning apparatus.

Spring loaded devices that provide for contact between a record/playback head and a floppy disk are disclosed in U.S. Pat. Nos. 3,678,481 and 3,946,439. The former describes a carriage with a single head and spring loaded pressure pad, while the latter shows a carriage with two heads that are forced together by two non-adjustable springs.

Although mechanisms exist in the prior art which tend to improve the positioning accuracy of threaded positioning devices by biasing a nut follower to eliminate the clearance between one set of facing screw thread flanks of mating threads, typically by using a spring to continuously bias the follower in one axial direction, long term accuracy is poor due to wear of the mating thread flanks.

SUMMARY OF THE PRESENT INVENTION

It is therefore a primary object of this invention to provide a high precision linear positioning apparatus for accurately positioning a magnetic record/playback head for use with a floppy disk drive.

An additional object of this invention is to provide a high precision linear positioning apparatus that minimizes loss of accuracy due to wear.

A further object of this invention is to provide a lead screw positioning apparatus having a nut follower that precisely translates in response to lead screw rotation by maintaining a zero clearance between two sets of facing screw thread flanks.

Another object of this invention is to provide a linear guidance mechanism which is referenced to a single fixed datum.

A still further object of this invention is to provide a linear guidance mechanism with linear bearings that are high precision, low friction and low cost.

Still another object of this invention is to provide a pivotable record/playback head positioning apparatus that allows adjustment of the contact force between two sets of facing screw thread flanks.

These and other objects, which will hereinafter become apparent, are accomplished in accordance with the illustrated preferred embodiment of this invention by providing a high precision linear positioning apparatus for efficiently and accurately positioning two magnetic record/playback head with respect to a floppy disk. This apparatus includes a carriage upon which the heads are mounted and a linear guidance mechanism comprising a fixed guide rod, a spring loaded guide rod and three carriage mounted linear bearings. The spring loaded guide rod is biased toward the fixed guide rod and forces two of the linear bearings against the fixed guide rod by action through the third linear bearing. Each linear bearing comprises two spherical balls, mounted in spherical seats, which spin in reaction to translation of the carriage. Radial positioning of the carriage and attached heads is accomplished by a lead screw driven by a stepper motor and coupled to the carriage through a zero backlash nut follower. The nut follower is mounted in a spherical seat in the carriage to allow slight rotations of the follower about axis perpendicular to the lead screw axis, and is restrained froom rotating about the lead screw axis. Two springs force the nut follower against the spherical seat and provide a torque to the nut follower about an axis perpendicular to the lead screw axis for eliminating the clearance between the screw threads of the lead screw and the nut follower. One of the two record/playback heads is rigidly attached directly to the carriage, while the other head is attached to a movable arm that is pivotably attached to the carriage by means of a spring mechanism. An adjustment screw acting on the spring is provided to adjust the contact force between the heads and the surface of the floppy disk.

In an alternative embodiment of the invention, a self-locking fastener is provided which is suitable for use as a part of a nut follower and comprises a threaded bolt, a nut, and means for applying a torque to the nut about an axis perpendicular to the axis of the bolt. Torque is provided by an off-center protuberance on the surface of the nut facing a surface to be engaged. Upon engaging such surface, the protuberance causes the nut to rotate, or cock, to a locking position whereby axial clearance between screw threads is eliminated.

An advantage of the present invention is that it compensates for wear of the positioning apparatus and thereby provides precise record/playback head positioning over a long period of use.

Another advantage of the present invention is that carriage guidance is accomplished by the use of only one precision guide rod and with simple, low friction linear bearings, thereby minimizing production cost.

A further advantage of the present invention is that it provides a carriage having a simple, pivotable head mounting which allows adjustment of the contact force between the heads and the floppy disk surface.

Other objects and advantages of the present invention will be apparent to those skilled in the art after having read the following detailed description of the preferred embodiments which are illustrated in the attached drawings.

DESCRIPTION OF THE DRAWINGS

FIG. 5 is an end view of a portion of the guidance mechanism utilized in the positioning apparatus of FIG. 1.

FIG. 6 is a partially broken sectional view showing the linear bearing assembly used with the positioning apparatus of FIG. 1.

FIG. 8 is a free body diagram of a spherical ball used in the bearing assembly of FIG. 6 showing the forces acting thereon.

FIG. 9 is a partially broken sectional view showing a lead screw and zero backlash nut follower employed in the positioning apparatus of FIG. 1.

FIG. 10 is an isometric view of the zero backlash nut follower shown in FIG. 4.

DESCRIPTION OF THE PREFERRED EMBODIMENT

Figure 1:
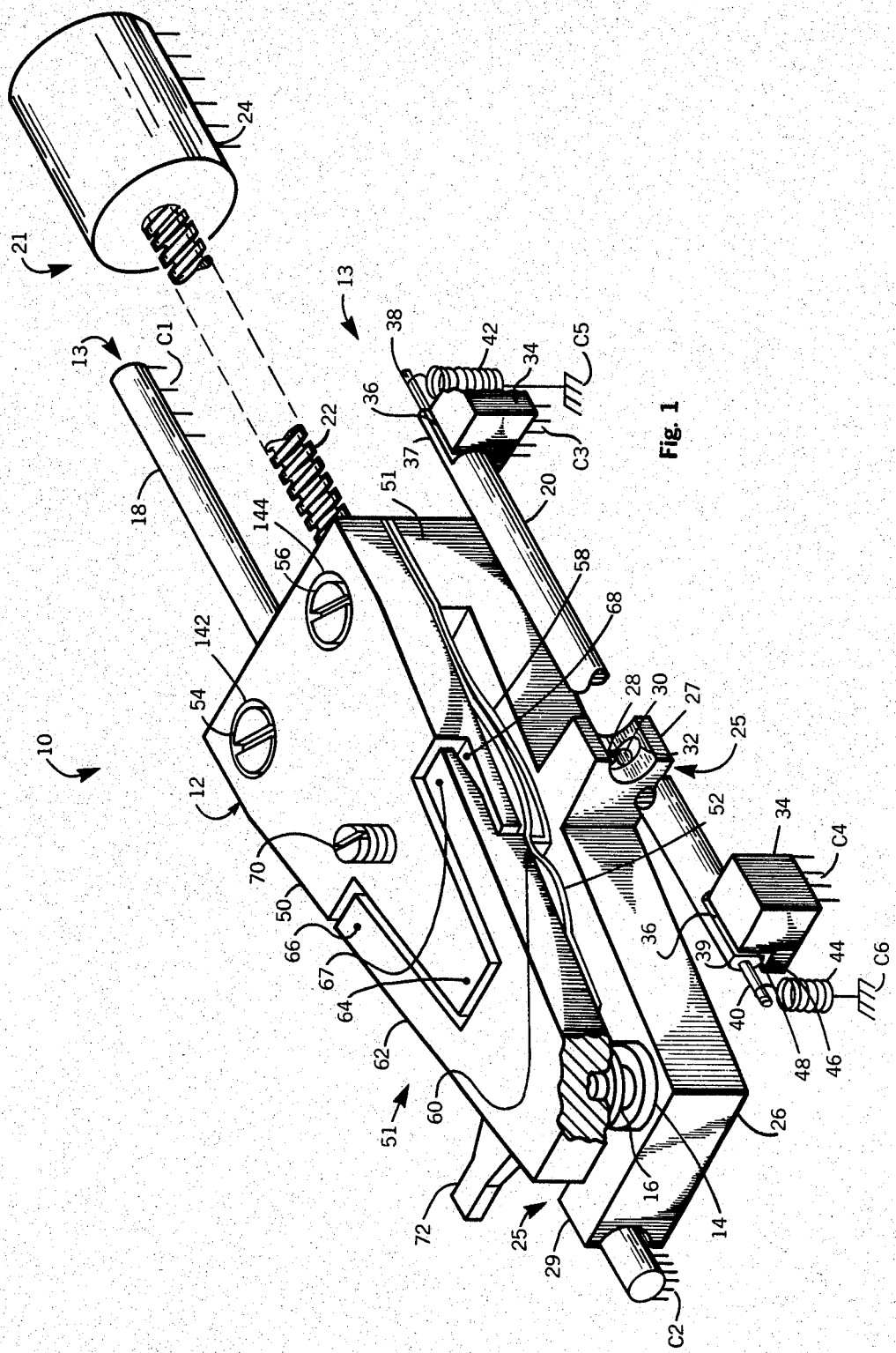
FIG. 1 is an isometric view showing a carriage and linear positioning apparatus, according to the present invention, used in positioning magnetic record/-playback heads in a disk drive.

Referring to FIG. 1, there is shown a magnetic head carriage and drive assembly according to a preferred embodiment of the present invention. Specifically, a high precision linear head carriage and positioning apparatus 10 is utilized to dynamically position two magnetic record/playback heads relative to a magnetic media (not shown) such as a floppy disk. The assembly comprises four major subsystems, namely: (1) a linear carriage guidance mechanism 13, (2) a bearing assembly 25, (3) a carriage drive mechanism 21, and (4) an upper head mount and preload mechanism 51. All four of these mechanisms cooperate to provide a means for effecting accurate and consistent head positioning.

A carriage 12 is provided for transporting a lower record/playback head 14 and an upper record/playback head 16 (see also FIGS. 2 and 3), and is guided for movement in a radial direction with respect to a floppy disk 146 (FIG. 2) by the linear guidance mechanism 13. Three bearing assemblies 25 provide a low-friction coupling between the carriage 12 and a pair of guide rods 18 and 20 which form the linear guidance mechanism 13. The radial drive mechanism 21 includes a lead screw 22 and a lead screw driving stepper motor 24 for moving the carriage 12 and its associated record/playback heads 14 and 16 into alignment with any of a series of concentric floppy disk recording tracks under direction from a disk drive controller (not shown).

Figure 2:
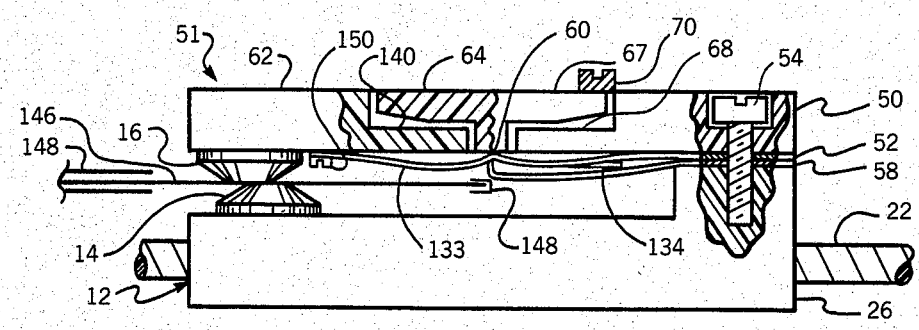
FIG. 2 is a side view, partially in section, of the carriage shown in FIG. 1 with its two record/playback heads disposed in their operational position.
Figure 3:
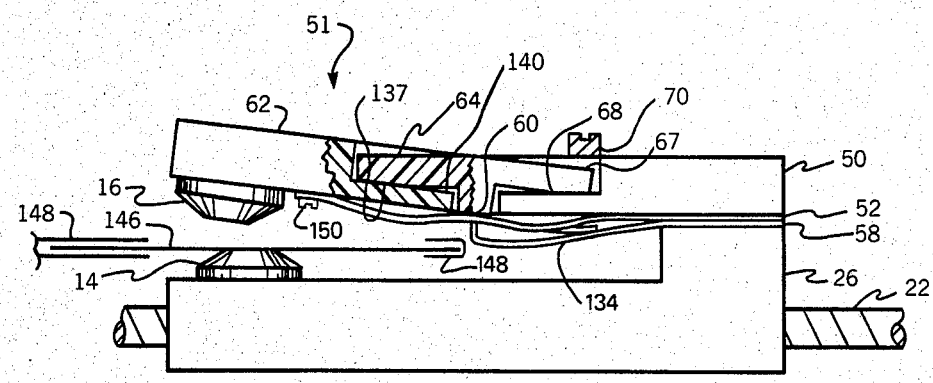
FIG. 3 is a side view, partially in section, of the carriage shown in FIGS. 1 and 2 with the upper head shown in its load/unload position.

The upper head pivot and preload mechanism 51 positions the upper record/playback head 16 in either an operational position for recording and playing back data, as shown in FIGS. 1 and 2, or in a load/unload position allowing the insertion and removal of a floppy disk 146 as shown in FIG. 3.

Further details of the apparatus shown in FIG. 1 will now be described by additionally referring to other Figs. of the drawing. Note that corresponding numbers in the several Figs. refer to corresponding parts of the apparatus.

(1) Linear Guidance Mechanism 13

Figure 4:
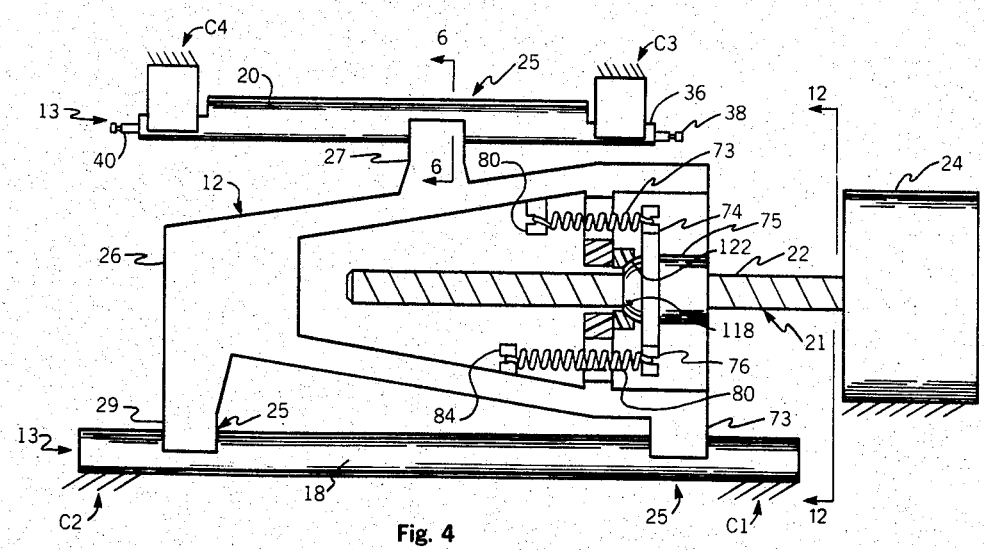
FIG. 4 is a bottom plan view of the apparatus of FIG. 1 showing details of a zero backlash nut follower employed therein.

FIG. 4 shows generally the layout of the guidance mechanism 13 as viewed from below. A smooth surfaced fixed guide rod 18 is attached at each end to a disk drive chassis (not shown) as represented schematically at C1 and C2, and is utilized as a datum for guiding the carriage movement. A front bearing assembly 29 and a rear bearing assembly 73 are carried by carriage 12 and are provided to engage and guide the carriage along the fixed guide rod 18. A third bearing assembly 27 is provided on the opposite side of carriage 12 and is positioned approximately midway between the longitudinal positions of the other two assemblies. The bearing assemblies will be further discussed below.

On the opposite side of the carriage 12 from the fixed guide rod 18, a spring loaded guide rod 20 is mounted on a pair of supports 34 and is positioned parallel to guide rod 18. Rod 20 is spring biased toward guide rod 18 by a pair of springs 42 and 44 which are eccentrically connected to the ends thereof in a manner more fully described below.

Two guidance functions are provided by the guide rod 20; the first is to bias the carriage toward the fixed guide rod 18, thereby forcing the front and rear bearing assemblies 29 and 73 into intimate contact with the guide rod 18. This biasing force toward guide rod 18 insures that during translation, the carriage 12 will utilize guide rod 18 as a datum.

The second guidance function of guide rod 20 is to provide a third point of support for the carriage 12 and at the same time provide a means for resisting rotation about the axis of guide rod 18.

The spring biasing mechanism associated with guide rod 20 is shown in FIGS. 1 and 5. As illustrated in FIG. 1, two guide rod supports 34 are mounted to the disk drive chassis at C3 and C4, and support the ends of the spring loaded guide rod 20. Portions of the ends of guide rod 20 are removed to form end sections 37 and 39 that are semicircular in cross-section. The end sections are then positioned in right angled notches 33 which are formed in the supports 34 by vertical walls 48 and horizontal surfaces 46 (FIG. 5). Two pins 38 and 40 respectively extend from the semicircular ends 37 and 39 of guide rod 20 and are located off-center relative to the axis of the rod. Two tension springs 42 and 44 are respectively connected between the spring pins 38 and 40 and the disk drive chassis at C5 and C6 to provide downward forces on the pins 38 and 40 that tend to cause rod 20 to rotate in the notches 36.

The supports 34 are spaced relative to guide rod 18 such that when carriage 12 and rod 20 are in position, there is a slight clearance between the flat faces 36 of rod 20 and the facing walls 48 of the supports 34. Rod ends 37 and 39 rest on horizontal surfaces 46 of the supports 34, and due to the moment imposed by springs 44 and 42, the edges 33 are caused to contact vertical surfaces 48 and together with the surfaces 46 upon which the ends rest serve as pivots about which rod 20 tends to rotate.

Whereas, rotation of rod 20 is the result of the off-center forces generated by the tension springs 42 and 44, the horizontal and vertical surfaces 46 and 48 constrain movement of rod 20 to a rolling and laterally translated motion toward rod 18 while at the same time maintaining a rod orientation which is level with and parallel to the axis of rod 18. This enables rod 20 to bias the carriage 12 toward the fixed guide rod 18 while simultaneously preventing carriage rotation around rod 18, thereby providing accurate linear guidance for the carriage 12 as it is driven by drive mechanism 21.

There are several advantages associated with the use of the guidance mechanism 13 described above. One is that since the carriage 12 is biased toward the fixed guide rod 18, the position of the carriage 12 is referenced to a single datum and, thus, alignment of the carriage with respect to the disk drive chassis is simplified. Another is that since clearances between the guide rods 18 and 20, and the linear bearings 25 are eliminated by this mechanism, wear of the guide rods or the bearings is compensated for and does not affect the positioning accuracy. Additionally, so long as the spring force of springs 42 and 44 exceed the maximum rotational torque applied by lead screw 22, the loading of heads 14 and 16 on the disk 146 (FIG. 2) will remain uniform.

(2) Linear Bearings Assemblies 25

In order to provide smooth translation of the carriage 12 along the guide rods 18 and 20, bearings 25 are utilized. In FIG. 6, the middle bearing assembly 27 is shown in section revealing upper and lower spherical balls 28 and 30 mounted in spherical bearing seats 32. The two spherical balls 28 and 30 respectively contact the guide rod 20 at points 91 and 93 which lie along straight lines 21 and 23 connecting the ball centers and the axis of rod 20. In addition, the balls contact the spherical bearing seats 32 at 85 and 87 respectively, and each other at 89. The spherical bearing seats 32 have a radius larger than the radi of the spherical balls 28 and 30 so that the balls have ball-to-seat point contacts (at 85 and 87) with the spherical bearing seats.

Figure 7:
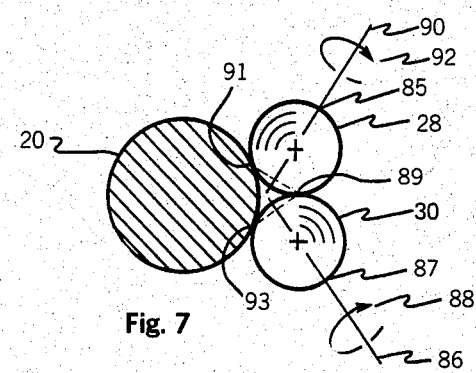
FIG. 7 is a schematic diagram of the linear bearing assembly of FIG. 6 showing the relative directions of rotation of the two spherical balls relative to the datum rod.

Contact points 85, 89 and 91 are located such that an axis 90 (FIG. 7) passing through the ball-to-seat contact point 85 and the center of the spherical ball 28 is a perpendicular bisector of a dashed line connecting the ball-to-ball contact point 89 to the ball-to-rod contact point 91. In a similar fashion, contact points 87, 89 and 93 are located such that an axis 86 passing through the ball-to-seat contact point 87 and the center of the ball 30 is a perpendicular bisector of a dashed line connecting the ball-to-ball contact point 89 to the ball-to-rod contact point 93. Since balls 28 and 30 must rotate relative to each other as well as relative to rod 20, and since the resultant rotational vectors will lie along the bisecting axis, the balls 28 and 30 will spin on the axes 90 and 86 respectively, in response to motion of the carriage 12. If, for example, the carriage 12 moves in a direction away from one observing FIG. 7, then the balls 28 and 30 will rotate about the axes 90 and 86 in directions indicated by the arrows 92 and 88 respectively.

The free-body diagram of FIG. 8 depicts the balance of contact forces 94, 96 and 98 acting on the ball 28 through the contact points 89, 85 and 91 respectively. As can be seen, this bearing design permits a simple and straight forward calculation of design loads.

Advantages of the bearing assemblies described above include low fabrication cost due to the simple construction and low part count, and low resistance to motion due to the minimization of sliding contact. Additionally, this bearing configuration compensates for wear when utilized with the linear guidance mechanism 13.

(3) Carriage Drive Mechanism 21

Radial positioning of the carriage 12, and the record/playback heads 14 and 16 mounted thereon, relative to a floppy disk engaged thereby, is accomplished through the use of a stepper motor controlled by a disk drive controller (not shown). The major elements of the drive mechanism 21 are shown in FIG. 4 and include the stepper motor 24, a lead screw 22 driven by the stepper motor, and a zero backlash nut follower 75 coupled to the carriage 12.

When a lead screw device is utilized for positioning, accuracy is typically limited by the amount of clearance, or backlash, between mating threads. Although a reduction in the backlash will result in improved positioning accuracy, it may result in thread binding during operation. The present invention employs a novel technique for the elimination of backlash which includes the rotation of the nut follower 75 about an axis normal to the plane of FIG. 4 and perpendicular to the axis of the lead screw 22.

The effect of such rotation is shown in detail in FIG. 9 wherein a torque illustrated by the force couple arrows 100 is applied to the nut follower 75 so as to rotate it until screw thread flanks 108 and 109 of the nut follower, and screw thread flanks 106 and and 107 of the lead screw are in contact at points 102 and 104. With such engagement, the nut follower 75 is precisely located along the axis of lead screw 22 because the left facing flank 108 of the nut follower is in contact with the right facing flank 109 of the lead screw at the point 102, and the right facing flank 109 of the nut follower is in contact with the left facing flank of the lead screw at the point 104. By contacting both flanks 108 and 109, it will be appreciated that the axial position of the nut follower 75 is solely a function of the angular position of the lead screw 22. The magnitude of the torque provided by forces 100 is not large enough to cause thread binding since adequate clearances exist away from the contact points 102 and 104.

Figure 11:
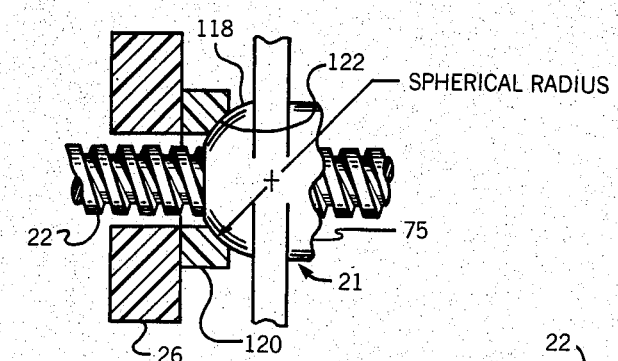
FIG. 11 is an enlarged view showing a portion of the nut follower of FIG. 4 with the spherical seat used therewith shown in cross-section.
Figure 12:
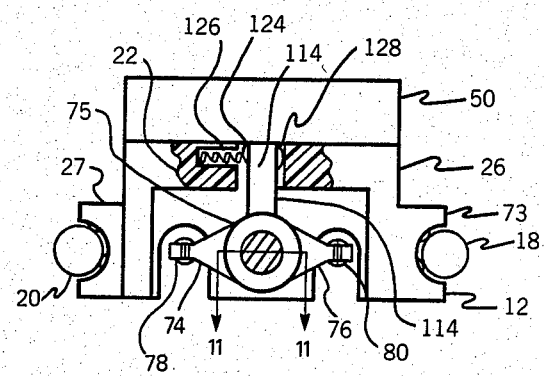
FIG. 12 is a partially broken rear view of the positioning apparatus of FIG. 1 showing further details of the zero backlash nut follower.

This zero backlash design is implemented in the preferred embodiment of the present invention as shown in FIG. 4, with details thereof being further shown in FIGS. 10, 11 and 12. The nut follower 75 includes two torque applying arms 74 and 76, which extend laterally of the body 75, and a spherical nose 118. Two tension springs 78 and 80, of equal spring rate and unstressed length, are respectively connected between the two torque applying arms 74 and 76 and two spring mounts 82 and 84 formed on carriage 12 on opposite sides of screw 22, the mount 84 being positioned slightly ahead of mount 82. The force applied by the spring 80 is thus slightly greater than the force applied by the spring 78 due to the former's greater installed length. The resulting force imbalance thus causes a clockwise torque to be applied to the nut follower 75 as viewed in FIG. 4.

The spherical nose 118 of the nut follower is forced into a spherical seat 122 on carriage 12 by the combined forces of the springs 78 and 80. These combined forces are selected to be greater than the axial force necessary to overcome the inertia of the carriage 12 as it follows the rotation of the lead screw 22. A support block 120, having the spherical seat 122 formed therein, receives the nose 118 and is forced against the surface of platform 26 by the spring forces 110 and 118 thereby allowing the nut follower 75 to seek a preferred position normal to the leadscrew 22 and independent of the normal position of platform 26 which comprises the lower portion of carrriage 12. Means for preventing the nut follower 75 from rotating relative to carriage 12 include an upstanding antirotation arm 114 (FIG. 10), which is forced against a contact pad 128 by a compression spring 124 mounted in a cavity 126, as shown in FIG. 12. This arrangement allows nut follower 75 to rotate in the spherical seat 122 and about the axis of arm 114 to eliminate backlash while at the same time conforming to any runout irregularities in the lead screw 22, but prevents rotation of the nut follower about the axis of the lead screw. In this manner, the location of the carriage 12 is precisely related to the angular position of the lead screw 22.

FIG. 10 pictorally depicts the nut follower 75 showing application of the spring forces 110, 112 and 116 that are applied by the springs 78, 80 and 124 respectively.

The above-described drive mechanism 21 has many advantages over other mechanisms of similar function. For example, accuracy of positioning the carriage 12 with respect to the angular rotation of the lead screw 22 is greatly enhanced by the function of the zero backlash nut follower 75. Standard screw thread clearances may be used for fabrication of the lead screw 22 and the nut follower 75, and such clearances will not affect the positioning accuracy of the drive mechanism 21. Moreover, wear of the mating threaded parts will not decrease positioning accuracy because the nut follower 75 will rotate to whatever position is necessary to eliminate clearances incurred due to wear. In addition, wear will occur on all surfaces simultaneously, thereby cancelling any affect on positioning accuracy.

(4) Upper Head Mount and Preload Mechanism 51

During operation of a disk drive, the record/playback heads are in a disk contact position engaging the surface of the rotating magnetic disk to record and playback magnetically encoded information. The upper head must be biased toward the disk so as to provide a predetermined constant contact force between the heads and the magnetic surface with such force being large enough to maintain the desired degree of contact, yet light enough so as not to cause excessive wear of the disk and/or heads. However, during disk load and unload, the heads must be separated to allow for insertion and removal of the disk. The preferred embodiment of a carriage in accordance with the present invention includes a mechanism which allows the upper record/playback head 16 to be moved between two positions, yet be precisely positioned relative to the carriage.

As depicted in FIG. 1, carriage 12 is comprised of a lower portion forming a lower platform 26 carrying the lower head 14 and having the three bearing assemblies 27, 29 and 73 (FIG. 4) formed therein, an upper platform 50 rigidly affixed by screws 54 and 56 to an upstanding portion 51 of platform 26, a head load spring 52, a cantilever spring 58, and a pivotable arm 62 which carries the upper head 16.

Figure 13A:
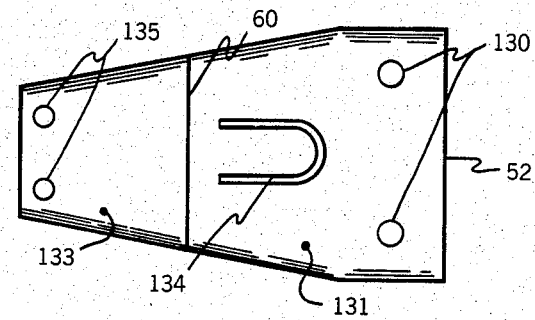
FIGS. 13a, 13b and 13c respectively show a plan view, a side view, and an installed view of a head biasing spring utilized in the positioning apparatus of FIG. 1.
Figure 13B:
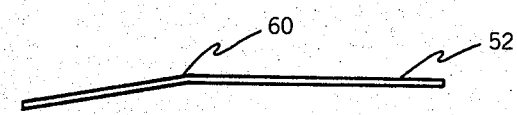
Figure 13C:
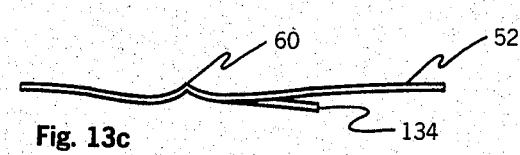

As is more clearly shown in FIGS. 13a, 13b and 13c, the spring 52 is a bent sheet of spring metal tapered toward one end and having two "base end" mounting holes 130, two "head end" mounting holes 135, and a bend line 60 which divides the spring into two portions 131 and 133. A head load adjusting tab 134 is formed by a U-shaped cutout in the portion 131.

Figure 14A:
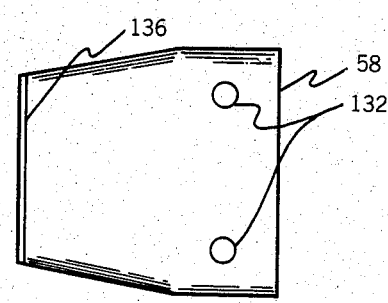
FIGS. 14a and 14b respectively show a plan view and a side view of the cantilever spring utilized in conjunction with the head biasing spring of FIG. 13.
Figure 14B:
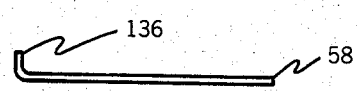

As depicted in FIGS. 14a and 14b, the cantilever spring 58 is comprised of a tapered sheet of spring metal having mounting holes 132 provided near the base end and an upturned flauge 136 at the head end. The base ends of springs 52 and 58 are attached to the carriage 12 by clamping them between the upstanding portion 51 of platform 26 (FIG. 1) and the upper platform 50. Two screws 54 and 56 are installed through two counterbored holes 142 and 144 in platform 50 and through the mounting holes 132 and 130, in the springs 52 and 58 respectively, and are threaded into portion 51 (FIG. 1).

Figure 15:
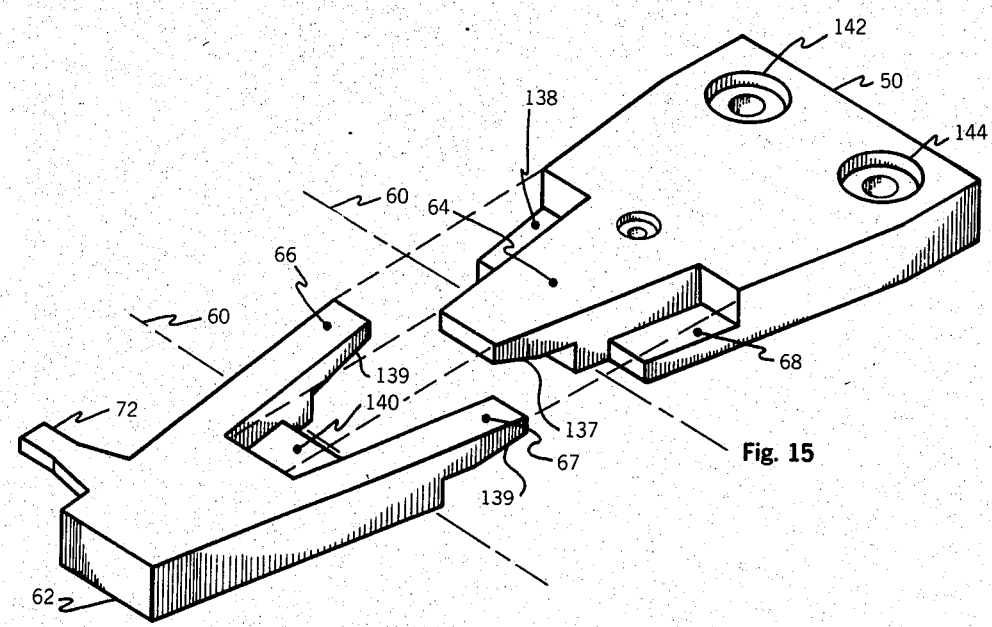
FIG. 15 is an exploded isometric view showing the fixed upper platform element and the movable arm which when combined with the springs of FIGS. 13 and 14, provide a pivotable spring loaded mounting for a record/playback head.

As illustrated more clearly in the exploded view of FIG. 15, the upper platform 50 includes a centrally disposed, forwardly extending tab portion 64 flanked on either side by notched portions forming horizontal stop surfaces 68 and 138. Note that the bottom side of tab 64 is notched and beveled as indicated at 137.

The arm 62 has a pair of rearwardly extending tabs 66 and 67 forming a fork-like structure for mating with the tab 64. Note that a recess is formed between tabs 66 and 67 to provide a stop surface 140 for engaging the beveled lower face 137 of tab 64, and the undersides of tabs 66 and 67 are notched and beveled as indicated at 139. A laterally extending lift tab 72 is also provided.

Two screws 150 (FIG. 2) attach the movable arm 62, with the upper record/playback head 16 mounted thereon, to the forward portion 133 of spring 52 and at the same time locate arm 62 relative to the upper platform 50. Note that the tab 64 extends between the tabs 66 and 67 and overlies stop surface 140, and the tabs 66 and 67 extend into the side notches formed in member 50 to overlie surfaces 138 and 68 respectively. Note also that tabs 64, 66 and 67 all engage the bend line 60 and are held in such engagement by the spring force of spring 52. The bend line 60 is also engaged by the upturned end of spring 58 which insures that the bend line 60 does not move out of engagement with tab 64.

When the movable arm is rotated about bend line 60 into the operating position shown in FIG. 2, the spring 52 takes the shape indicated in FIG. 13c. Since the base end of the spring 52 is clamped in a horizontal disposition to the undersides of platform 50 and arm 62 respectively, the spring is caused to bend into the shape shown with the bend line 60 contacting the underside of both the tab 64 and the tabs 66 and 67. It will thus be appreciated that spring 52 will cause arm 62 to be biased to rotate downwardly about the bend line 60. To adjust the spring force applied to arm 62, and correspondingly, the contact force between the upper record/playback head 16 and the disk surface 146, an adjustment screw 70 is provided which contacts the load adjust tab 134. Turning the adjustment screw 70 so that it moves downward rotates tab 134 downwardly thereby applying a small rotational force to the spring 52 about the bend line 60 thereby decreasing the resultant contact force applied to the upper record/playback head 16.

To allow for disk insertion and removal, the arm 62 is rotated upwardly to a disk load/unload position as indicated in FIG. 3, providing sufficient clearance between the upper and lower record/playback heads to allow a protective disk envelope 148 to pass therebetween. The lift tab 72 (FIG. 1) is provided on arm 62 to serve as a means by which a lifting bale or other means may lift the movable arm. The load/unload postion of the arm 62 is defined by the several tabs and stops provided in the structure of arm 62 and the upper platform 50. As illustrated in FIG. 3, when arm 62 is rotated into its open position, it pivots about the bend line 60 of spring 52 until surface 137 of tab 64 is engaged by the central stop surface 140 and the beveled surface 139 engage the two lateral stop surfaces 68 and 138 of upper platform 50. The movable arm 62 and the attached upper record/playback head 16 are positioned both laterally and longitudinally by the spring 52 which permits rotation thereof between the load/unload positions but always causes the upper head 16 to be returned to the same operating position with the same media engaging force. Easily accessible adjustment of the contact force between the upper record/playback head 16 and the disk surface 146 is also provided by means of the screw 70.

ALTERNATIVE EMBODIMENTS

Figure 16:
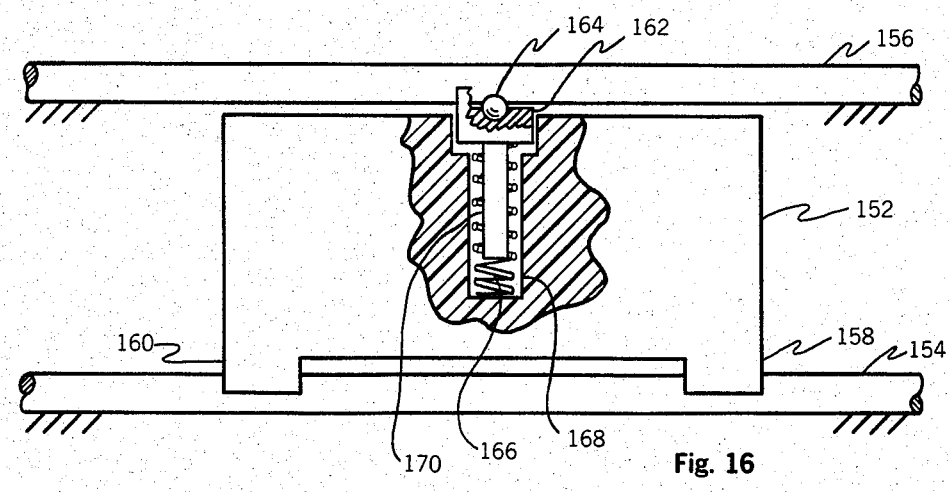
FIG. 16 is a partially broken plan view showing generally an alternative embodiment of a guidance mechanism in accordance with the present invention.

An alternative embodiment of the aforementioned linear guidance mechanism 13 is shown generally in FIG. 16. In this embodiment the biasing function of the spring loaded guide rod 20 is alternatively accomplished by a spring loaded middle bearing assembly 162 which engages a second fixed guide rod 156. The carriage 152 with front and rear bearing assemblies 160 and 158 provided on opposite sides thereof is guided in linear motion by the primary guide rod 154. The middle bearing assembly 162 includes ball bearings 164 of the type previously described, a bearing carrier 170, and a compression spring 166 mounted in a cavity 168. The middle bearing assembly 162 is spring loaded against the secondary guide rod 156 so as to urge the front and rear bearing assemblies 160 and 158 into intimate contact with the primary guide rod 154.

Figure 17:
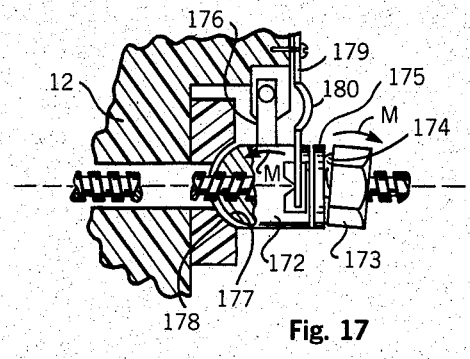
FIG. 17 is a partially broken side view showing an alternative embodiment of a nut follower in accordance with the present invention.

An alternative embodiment to the zero backlash nut follower 75 is shown in FIG. 17 and includes a pair of fore and aft threaded members 172 and 173 and a resilient ring 175 disposed therebetween. An offcenter bump 174 is formed on one face of the nut 172 for engaging ring 175. A suitable upstanding arm 176 similar to the arm 114 shown in FIGS. 10 and 12 couples the nut pair to the carriage 12 so as to prevent rotation of the nut in a plane transverse to lead screw 22. Nut 172 has a spherical nose 177 which engages a spherical seat 178 in carriage 12. Engagement between nose 177 and seat 178 is maintained by a spring 179, the lateral dimension, i.e., transverse to lead screw 22, is reduced at 180 so as to a small amount of rotation about the axis of arm 176.

In use, the nut 172 is threaded onto the lead screw 171 until bump 174 engages ring 175. With nut 172 held stationary, nut 173 is then further rotated relative to nut 172 until a predetermined differential torque is reached between the two. The resultant force imparted to the upper sides of nuts 172 and 173 will cause both nuts to experience rotational moments, as indiacted by the arrows M, having an effect similar to that described above relative to the FIG. 9 embodiment. The purpose of ring 175 is to insure that as the threads of lead screw 22 and nuts 172 and 173 wear the moment forces M will continue to exist. More specifically, by judiciously selecting the durometer of ring 175, it will be appreciated that even as the engaging lead screw and nut thread faces wear, substantially constant rotational forces in the direction of arrows M will be applied to the nuts 172 and 173.

Figure 18:
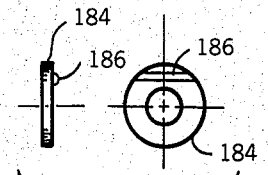
FIG. 18 shows front and side views of a washer utilized to implement a further alternative of the nut follower shown in FIG. 17.

A second alternative embodiment of a selfbiasing nut assembly employs a resilient washer 184 having an off-center bump or ridge 186 provided on one face as shown in FIG. 18. In use, the washer 184 is placed between a pair of nuts such as 172 and 173 in FIG. 17, and similarly, when the nut 173 is tightened relative to nut 172, the bump 186 causes both nuts to experience a moment force M about an axis perpendicular to the axis of the lead screw 22 which both locks the nuts in place relative to each other and accomplishes the purpose stated above.

Figure 19:
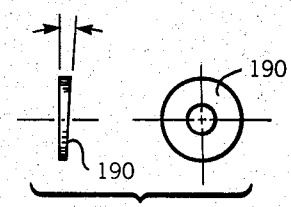
FIG. 19 shows front and side views of another embodiment of a washer utilized to implement a further alternative of the nut follower shown in FIG. 17.

An additional embodiment of a resilient washer that may be used in place of the embodiment of FIG. 18 is that shown at 190 in FIG. 19. In this embodiment the washer 190 has a tapered cross-section which when used in place of the washer 184 of FIG. 18, causes substantially the same result to be obtained.

Figure 20:
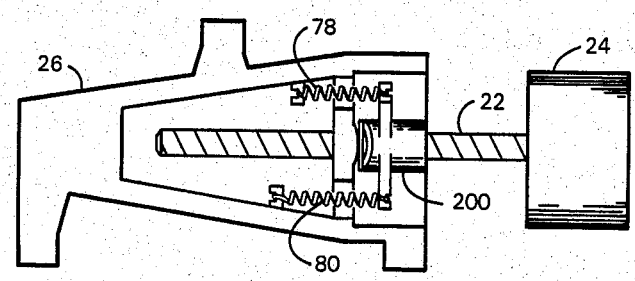
FIG. 20 is a bottom plan view of the apparatus of FIG. 1 employing an alternative embodiment of a zero backlash nut follower.
Figure 21A:
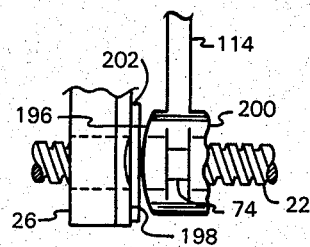
FIGS. 21a and 21b respectively show a side view and a bottom plan view of the nut follower of FIG. 20.
Figure 21B:
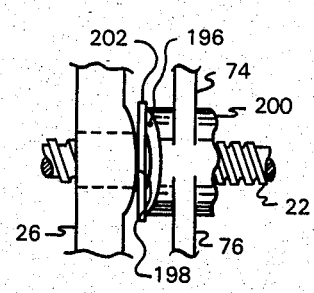

An alternative embodiment of the zero backlash design that incorporates rolling surfaces to reduce rotational friction is shown in FIGS. 20, 21a, and 21b. Instread of utilizing a spherical bearing to permit rotation of the nut follower as previously described, this embodiment utilizes two curved surfaces of contact 196 and 198 between the nut follower 200 and the platform 26. The first curved surface 196 is situated on the face of the nut follower 200 toward the contact point with the platform 26 and is radiused about a first axis that is orthogonal to the axis of the lead screw 22. The second curved surface 196 is situated on the platform adjacent the first curved surface 196 and is radiused about a second axis that is orthogonal to both the first and lead screw axes. A flat plate 202 is positioned between the curved surfaces, thereby separating them and permitting independent rolling of the nut follower about the first axis of the nut follower and the flat plate in tandem about the second axis in response to torque applied to the two torque arms 74 and 76 by the two tension springs 78 and 80.

Figure 22A:
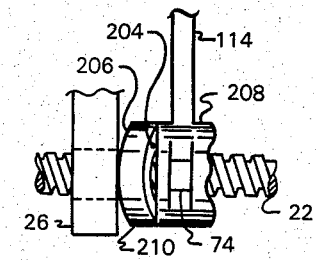
FIGS. 22a and 22b respectively show a side view and a bottom plan view of another alternative embodiment of a zero backlash nut follower.
Figure 22B:
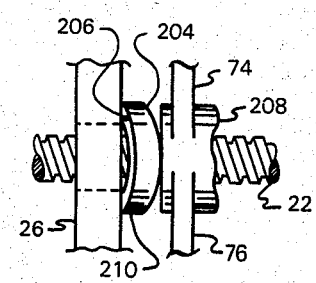

Another alternative embodiment of the zero backlash design also incorporates two curved surfaces 204 and 206 to permit nut follower rotation and is shown in FIGS. 22a and 22b. In this instance, the curved surfaces 204 and 206 are situated on opposite faces of a spacer 210 that is positioned between the nut follower 208 and the platform 26. As above, the curved surfaces are radiused about axes that are mutually orthogonal to each other and the lead screw axis. The first curved surface 204 permits rolling of the nut follower about one axis and the second curved surface 206 permits rolling of the nut follower and the spacer 210 in tandem about the other axis in response to torque applied to the two torque arms 74 and 76.

As will be apparent to those skilled in the art, the above embodiments are intended to be illustrative of the several inventive features of the present invention and are not intended to be limiting in scope. It will also be apparent that various alterations and modifications may be made to the disclosed embodiments without departing from the inventive concepts thereof. Accordingly, it is intended that the following claims be interpreted as covering all alterations and modifications that reasonably fall within the true spirit and scope of the invention.

What is claimed is:

1. Head positioning apparatus for use in positioning one or more magnetic read/write heads relative to a storage medium, comprising:
carriage means:
drive means for moving said carriage means;
means forming an elongated primary guide way disposed in a fixed position on one side of said carriage means;
means forming an elongated secondary guide way disposed on the opposite side of said carriage means and oriented parallel to said primary guide way, said secondary guide way having at least its end portions partially cylindrical in configuration;
first and second bearing means attached to said one side of said carriage means in spaced apart relationship for following said primary guide way during movement of said carriage means;
third bearing means attached to said opposite side of said carriage means for following said secondary guide way during movement of said carriage means, said third bearing means being positioned along said opposite side of said carriage means at a longitudinal location midway between said first and second bearing means;
first and second support means disposed respectively at opposite ends of said secondary guide way and each having first and second surfaces that intersect along a line parallel to the axis of said primary guide way, said first surface being oriented substantially parallel to the plane formed by the axes of said primary and secondary guide ways, said second surface being substantially perpendicular to said first surface, said cylindrically configured end portions of each end of said secondary guide way being disposed in supported engagement with said first surfaces of said first and second support means; and
biasing means for applying a biasing force to said secondary guide way tending to cause it to roll on said first and second support surfaces away from said second surfaces thereby tending to bias said carriage means toward said primary guide way.

2. Head positioning apparatus as recited in claim 1 wherein said biasing means includes:
an eccentric pin mounted on said secondary guide way; and
an extension spring coupled to said eccentric pin for causing rotation of said secondary guide way relative to said first and second support means.

3. Head positioning apparatus as recited in claim 1 wherein said primary and secondary guide ways are cylindrical rods.

4. Head positioning apparatus as recited in claim 3 wherein each of said first, second and third bearing means comprises:
two spherical balls; and
a bearing seat which positions said spherical balls in contact with each other and in contact with one of said cylindrical rods and orients the centers of said spherical balls in a plane perpendicular to the axes of said cylindrical rods so as to allow counterrotation of said spherical balls as they rollingly engage one of said cylindrical rods during movement of said carriage therealong.

5. Head positioning apparatus as recited in claim 4 wherein said bearing seat comprises cavities having partially spherical walls with radii slightly larger than the radii of said spherical balls.

6. Head positioning apparatus as recited in claim 1 wherein said drive means includes a threaded lead screw and a nut follower including:
a first nut body having a threaded aperture passing therethrough for receiving said threaded lead screw and at least one generally planar first end wall lying in a plane transverse to the longitudinal axis of said threaded aperture;
a second nut body having a threaded aperture passing therethrough for receiving said threaded lead screw and at least one generally planar second end wall lying in a plane transverse to the longitudinal axis of said threaded aperture and facing said first end wall, means projecting outwardly from an arcuate portion of less than 180 degrees of the face of said second end wall in a direction generally parallel to said longitudinal axis for engaging said first end wall as said nut body is rotated on said lead screw in a direction so as to advance along the screw toward said first end wall and into a fixed position relative thereto such that said projecting means is operative upon engagement with said first end wall to exert a force on said first nut body tending to cause rotation thereof about an axis normal to said longitudinal axis and in a plane including said longitudinal axis.

7. Head positioning apparatus as recited in claim 6 wherein said projecting means is in the form of a small nodule projecting from said end wall.

8. Head positioning apparatus as recited in claim 6 wherein said projecting means is in the form of a ridge extending across an arcuate portion of said end wall.

9. Head positioning apparatus as recited in claim 1 wherein said drive means includes a threaded screw and a nut follower comprising:
a nut body
having a threaded aperture passing through said body for receiving said threaded screw, and at least one generally planar end wall lying in a plane rotated less than 45 degrees away from a plane lying transverse to the longitudinal axis of said threaded aperture such that when said nut body is rotated on said threaded screw a direction so as to advance along the screw toward a facing wall lying transverse to the longitudinal axis of said screw, a minor arcuate portion of said end wall will engage said facing wall before the remaining major portion thereof engages said facing wall, and in so doing will cause a force to be applied to said nut body tending to cause rotation thereof in a plane including said longitudinal axis.

10. Head positioning apparatus for use in positioning one or more magnetic read/write heads relative to a storage medium, comprising:
carriage means;
drive means for moving said carriage means and including
a threaded lead screw;
means for rotating said lead screw;
a rigid nut follower with internal threads having a pitch equal to that of the external threads of said lead screw; and
torque applying means coupled to said nut follower for applying a rotational force couple to said nut follower tending to rotate said nut follower in a plane including the axis of said lead screw and about an axis perpendicular to the axis of said lead screw such that at least two oppositely facing flanks of the internal threads of said nut follower are caused to continuously contact corresponding flanks of the external thread of said lead screw;

a primary guide way disposed on one side of said carriage means;

a secondary guide way disposed on the opposite side of said carriage means and oriented parallel to said primary guide way;

first and second bearing means attached to said one side of said carriage means in spaced apart relationship for following said primary guide way during movement of said carriage means;

third bearing means attached to said opposite side of said carriage means for following said secondary guide way during movement of said carriage means, said third bearing means being positioned along said opposite side of said carriage means at a longitudinal location midway between said first and second bearing means; and biasing means for applying a biasing force to said carriage means through said bearing means for biasing said carriage means toward said primary guide way.

11. Head positioning apparatus as recited in claim 10 wherein said torque applying means is an annular washer having means projecting outwardly from an arcuate portion of less than 180 degrees of said washer and in a direction generally parallel to said lead screw axis for engaging a facing wall as said nut follower is rotated on said lead screw in a direction so as to advance toward said facing wall, said projecting means being operative upon engagement with said facing wall to exert a force on said nut follower tending to cause rotation thereof in a plane including said axis.

12. Head positioning apparatus as recited in claim 11 wherein said projecting means is in the form of a small nodule projecting from one side of said washer.

13. Head positioning apparatus as recited in claim 11 wherein said projecting means is in the form of a ridge extending across an arcuate portion of said washer.

14. Head positioning apparatus as recited in claim 10 and further comprising nut carrier means for coupling said nut follower to said carriage, and wherein said torque applying means includes a first lever attached to said nut follower, and a first spring connected between said first lever and said nut carrier means for providing a first force which acts through said first lever to produce a rotation of said nut follower about an axis perpendicular to the axis of said lead screw to cause said continuous contact and thus eliminate clearance between said two flanks and said corresponding flanks.

15. Head positioning apparatus as recited in claim 14 and further comprising a second lever attached to said nut follower in an orientation opposed to that of said first lever, and a second spring connected between said second lever and said nut carrier means for providing a second force, said first and second forces combining to yield a differential force which causes a rotation of said nut follower about an axis perpendicular to the axis of said lead screw to cause said continuous contact and thus eliminate clearance beteween said two flanks and said corresponding flanks.

16. Head positioning apparatus as recited in claim 15 and further comprising a spherical seat for receiving a mating portion of said nut carrier and allowing rotation thereof in planes including the axis of said lead screw, and means for preventing rotation of said nut follower about the axis of said lead screw.

17. Head positioning apparatus as recited in claim 16 wherein said means for preventing rotation of said nut follower comprises:

a third lever attached to said nut follower;

a stop formed on said carrier and engageable by said third lever; and a third spring carrier by said carrier and operative to bias said third lever against said stop.

18. Head positioning apparatus as recited in claim 15 and further comprising rolling contact means disposed between said nut follower and said carriage for allowing said nut follower to rotate about axes perpendicular to the axis of said lead screw, said rolling contact means including a first curved surface contacting a first flat surface along a first line of contact and a second curved surface contacting a second flat surface along a second line of contact perpendicular to said first line of contact.

19. Head positioning apparatus for use in positioning one or more magnetic read/write heads relative to a storage medium, comprising:

carriage means for carrying said read/write heads and allowing movement of at least one of said heads between a storage medium engaging position and a disengaged position wherein said one head is moved out of contact with said medium and includes drive means for moving said carriage means; platform means coupled to said drive means for moving said carriage means relative to the storage medium, said platform means including coupling means for coupling said platform means to the drive means, and first tab means projecting away from said coupling means;

arm means for carrying said one head proximate one extremity thereof and having opositely extending second and third tab means separated to form a space for receiving said first tab means; and spring means including a sheet of resilient material folded along a bend line to divide said sheet into a first portion and a second portion, wherein said first portion at rests lies in a second plane that angularly intersects said second portion along said bend line, said spring means being positioned beneath said platform means and said arm means such that said bend line engages the bottom surface of said first, second and third tab means, said first portion being bowed upwardly toward the bottom of said platform means with a distal part of said first portion being rigidly attached thereto, said second portion being bowed upwardly toward the bottom of said arm means with a distal part of said second portion being rigidly attached thereto, whereby said spring means serves as a means for locating said arm means relative to said platform means, and said bend line serves as a fulcrum about which said arm means may be rotated relative to said platform means and between said engaging position and said disengaged position;

means forming an elongated primary guide way disposed in a fixed position on one side of said carriage means;

a secondary guide way disposed on the opposite side of said carriage means and oriented parallel to said primary guide way;

first and second bearing means attached to said one side of said carriage means in spaced apart relationship for following said primary guide way during movement of said carriage means;

third bearing means attached to said opposite side of said carriage means for following said secondary guide way during movement of said carriage means, said third bearing means being positioned along said opposite side of said carriage means at a longitudinal location midway between said first and second bearing means; and biasing means for applying a biasing force to said carriage means through said bearing means for biasing said carriage means toward said primary guide way.

20. Head positioning apparatus as recited in claim 19 wherein said arm means includes stop means for engaging said first tab means as said arm means is rotated into said disengaged position.

21. Head positioning apparatus as recited in claim 19 for 20 wherein said platform means includes stop means which are engaged by said second and third tab means as said arm means is rotated into said disengaged position.

* * * * *